Patented Sept. 3, 1929.

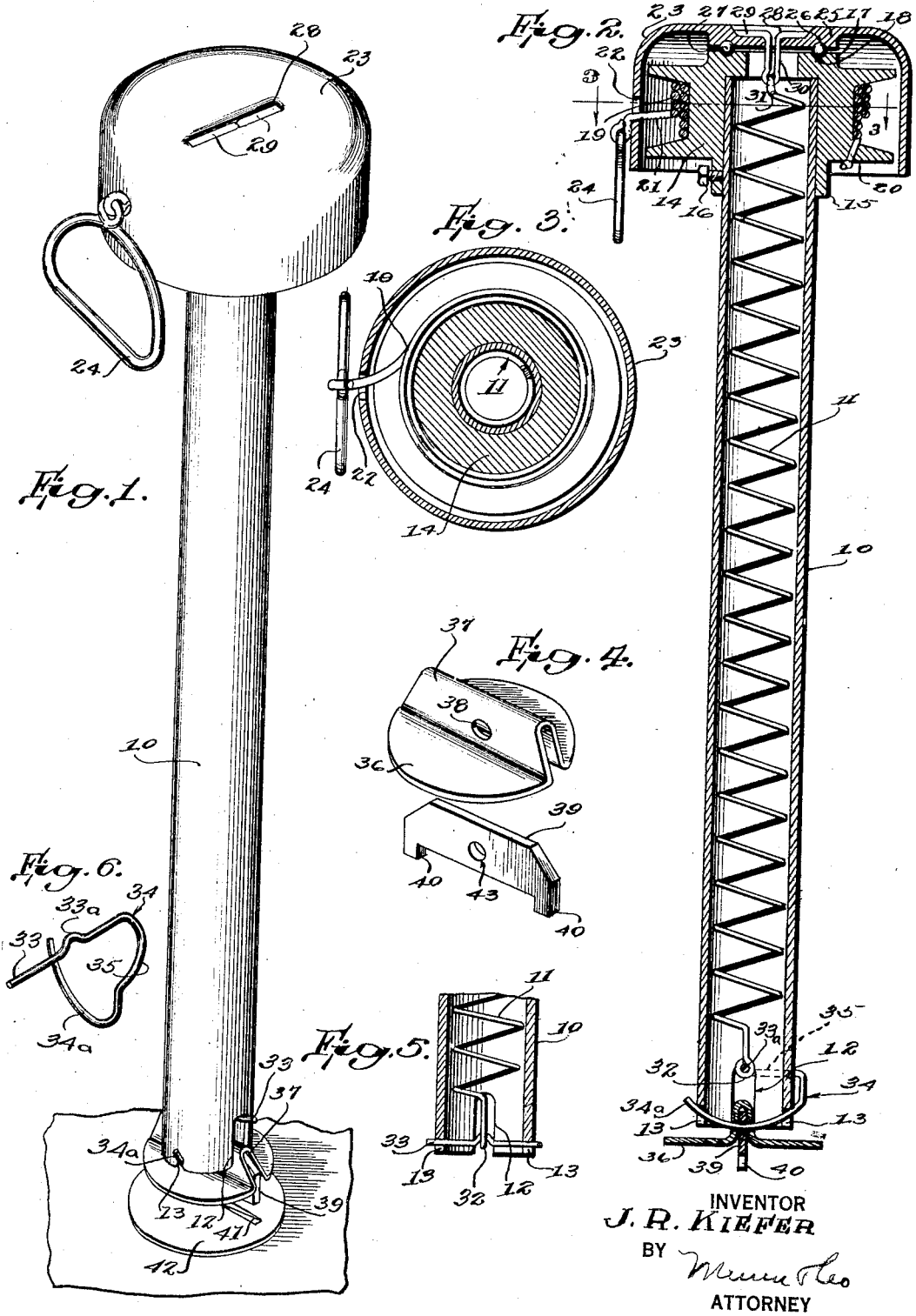

1,727,292

UNITED STATES PATENT OFFICE.

JOSEPH R. KIEFER, OF JEFFERSON, OHIO.

VALVE GRINDER.

Application filed April 9, 1928. Serial No. 268,522.

This invention relates to valve grinders.

An object of the invention is the provision of a valve grinder which may be tilted at any angle from the vertical during the operation of grinding the valve in which an adjusting plate is resiliently supported at one end of a rotatable barrel for carrying a valve wrench.

A further object of the invention is the provision of a valve grinder which has a handgrip adapted to be retained in a stationary position while rotatably supporting a hollow shaft, said shaft housing a spring which is placed under tension by manual rotation of the shaft in one direction, the shaft being rotated in the opposite direction by the spring when released, the spring being employed for connecting the hand grip and the valve wrench to the barrel.

This invention will be best understood from a consideration of the following detailed description; nevertheless it is to be understood that the invention is not confined to the disclosure, being susceptible of such changes and modifications which shall define no material departure from the salient features of the invention as expressed in the appended claims.

In the drawings:

Figure 1 is a view in perspective of a valve grinder constructed according to the principles of my invention, Figure 2 is a vertical section of the valve grinder, Figure 3 is a horizontal section taken along the line 3—3 of Figure 2, Figure 4 is a perspective view shown in detached relation of an adjusting plate and a valve wrench, Figure 5 is a fragmentary vertical section of the lower end of the valve grinder showing the wrench and plate removed, Figure 6 is a view in perspective of a wire supporting bracket.

Referring more particularly to the drawings 10 designates a hollow shaft in which is mounted a coil spring 11. The shaft at its lower end is provided with a pair of diametrically disposed slots 12 and a pair of diametrically disposed notches 13, the notches being in a plane which is at right angles to the plane passing through the slots 12.

A flanged pulley or spool 14 has a boss 15 carrying a threaded bolt 16 for securing the pulley to the upper end of the shaft. The outer end of the pulley is provided with a boss 17 having an annular track 18. A cord 19 is secured at 20 to the pulley and is wrapped around the same so that the free end 21 projects through an opening 22 in the side wall of a cup-shaped hand grip 23. A finger ring 24 is secured to the free end 21 of the cord 19. The inverted cup-shaped hand grip 23 has an internal boss 25 provided with an annular groove 26 which cooperates with the groove 18 to receive ball bearings 27.

The outer face of the cup-shaped member 23 is provided with a groove 28 to receive the bent ends 29 of a cotter pin 30.

The upper end of the spring 11 has its free end as shown at 31 formed into an eye to receive the cotter pin 30. The other end of the spring is formed into an eye 32 to receive a straight arm 33 of a bracket 34. This bracket is also provided with a curved arm 35 extending from the straight arm and a hook 34$^a$ projects from the arm 35 in a plane which is at right angles to the plane passing through the arm 33. The arm 33 has a bent portion 33$^a$ which receives the eye 32.

A circular plate and disc 36 has its intermediate portion 37 bent into a U-shaped member or projection extending from one face of the disc. The side walls of the U-shaped member are adapted to be carried within the diametrically disposed slots 12 at the lower end of the hollow shaft 10. The U-shaped member acts as a key for locking the disc to the shaft whereby the disc will be rotated simultaneously with said shaft. The side walls of the U-shaped member are provided with aligned perforations 38 to receive the hook 34$^a$. A valve wrench 39 has depending prongs 40 which are adapted to engage the usual notches 41 in the valve head 42. The wrench is provided with a perforation 43 adapted to be aligned with the passages 38 so that when the hook 34$^a$ is placed into position it will be passed through the perforations 38 and 43 for retaining the wrench 39 in position within the U-shaped member 37.

The operation of my device is as follows:—

The parts of the device are assembled as shown in Figure 2. The hook 34$^a$ is inserted through the perforations 38 and 43 and the arm 33 is secured by the eye 32 of the spring 11, whereby the tension of the spring will maintain the arm 34$^a$ in engagement with the upper ends of the slots 12 while the hook 34$^a$ holds the valve wrench 39 and the plate 36 against displacement from the U-shaped member 37. It will be noted that the spring 11 is of less length than the shaft 10 so that when the eye 32 has received the straight portion 33 of the bracket 34, said spring will be under tension for maintaining hook 34ᵃ against displacement and the valve wrench and plate 36 in position. The spring maintains the hand grip 23 in proper position on the boss 17 of the spool or pulley 14.

The prongs 40 of the wrench 39 are inserted within the notches 41 of the valve head 42 and the finger ring 24 is then grasped and the cord 19 is withdrawn rapidly from the housing 23 thereby causing rotation of the pulley 14 and the shaft 10. When the finger ring has been released the spring 11 which had been uncoiled previously and placed under transverse tension will tend to normally adjust itself and reverse the rotation of the shaft 10. These operations of the withdrawing and releasing of the cord 19 may be repeated as often as is necessary.

An important feature of the device consists in the fact that while disc 36 is in engagement with the outer face of the valve head 42, and the prongs 40 of the wrench are in engagement with the sockets 41 the shaft 10 may be rocked at an angle to the vertical and upon opposite sides of the vertical while rotating said shaft. This is due to the fact that the spring 11 holds the arm rigidly in place while the plate 36 and wrench 39 are somewhat loosely supported on the hook 34ᵃ. The slots 12 are of sufficient width to permit such rocking movement.

The ends of the arm 33 may be engaged by the notches 13 as shown in Fig. 5, and maintained in position when the plate 36 and wrench 39 have been removed.

I claim:

1. A valve grinder comprising a hollow shaft, a pulley secured to the upper end of the shaft, a hand grip mounted on the pulley, an adjusting plate at the lower end of the shaft, a valve wrench mounted in the plate, a coil spring housed within the shaft and having one end connected to the hand grip, the other end of said spring being removably connected to the wrench and plate, and means for connecting the plate to the shaft whereby rotation of the shaft will cause rotation of the plate and wrench, means for rotating the pulley in one direction, said spring tending to rotate the pulley in the opposite direction, said plate being movable relative to the shaft for maintaining the wrench in an operative position on the work when the shaft is oscillated.

2. A valve grinder comprising a hollow shaft, a pulley secured to the upper end of the shaft, a hand grip mounted on the pulley, an adjusting plate on the lower end of the shaft, a valve wrench mounted in the plate, a coil spring housed within the shaft and having one end connected to the hand grip, the other end of said spring being removably connected to the wrench and plate, and said plate having spaced flanges to receive the wrench, the lower end of the shaft having notches in which the flanges are fitted, means for rotating the pulley in one direction, said spring tending to rotate the pulley in the opposite direction, said plate being movable relative to the shaft for maintaining the wrench in an operative position on the work when the shaft is oscillated.

3. A valve grinder comprising a hollow shaft, a hand grip mounted on one end of the shaft and adapted to be retained against rotation when the shaft is rotated, a plate having a socket and engaging the other end of the shaft, a valve wrench mounted in the plate, the shaft and plate being provided with cooperating means for removably connecting the plate to the shaft, means for causing rotation of the shaft in one direction, a spring for causing reverse rotation of the shaft and connecting the hand grip with the connecting means between the plate and said shaft, said plate being movable relative to the shaft for maintaining the wrench in an operative position.

4. A valve grinder comprising a hollow shaft, a hand grip mounted on one end of the shaft and adapted to be retained against rotation when the shaft is rotated, a plate having a portion bent to form a socket and engaging the other end of the shaft, the shaft being provided with slots, the bent portion of the plate received within the slots and forming a key for locking the plate to the shaft, means for causing rotation of the shaft and plate in one direction, a spring for causing reverse rotation of the shaft and plate, a bracket supported on the shaft by the spring and having a hook for carrying the plate, and a wrench carried by the plate, said plate being movable relative to the longitudinal axis of the shaft whereby the plate will retain the wrench in a predetermined operative position on the work when the shaft is oscillated.

5. A valve grinder comprising a hollow shaft, a hand grip mounted on one end of the shaft, and adapted to be retained against rotation when the shaft is rotated, a plate having a perforated U-shaped projection providing a wrench socket, a perforated wrench received by the socket, the shaft having slots to receive the U-shaped projection, the projection forming a key for locking the plate to the shaft, means for causing rotation of the shaft in one direction, a spring for causing reverse rotation of the shaft, a bracket supported on the shaft by the spring and having a hook to receive the perforations in the wrench and U-shaped projection of the plate.

JOSEPH R. KIEFER.